Oct. 6, 1964 C. A. HICKS 3,151,501
MECHANICAL TAPPET
Filed Sept. 30, 1960
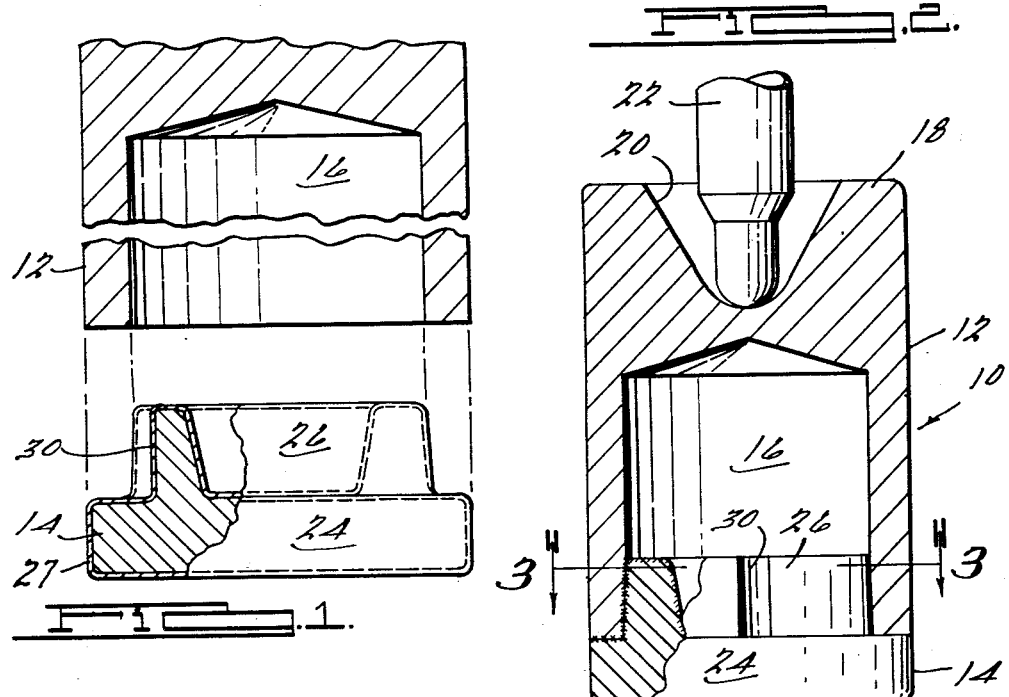
FIG. 1.
FIG. 2.
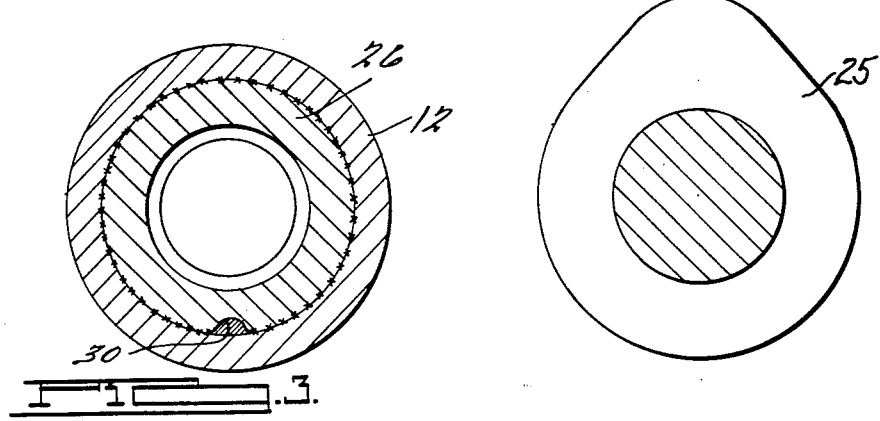
FIG. 3.
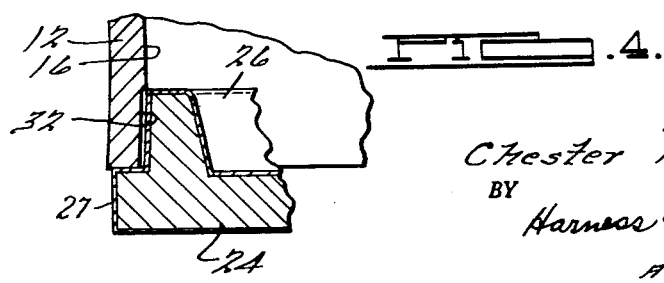
FIG. 4.
INVENTOR.
Chester A. Hicks.
BY
Harness & Harris
ATTORNEYS.

United States Patent Office 3,151,501
Patented Oct. 6, 1964

3,151,501
MECHANICAL TAPPET
Chester A. Hicks, Kokomo, Ind., assignor to Chrysler Corporation, Highland Park, Mich., a corporation of Delaware
Filed Sept. 30, 1960, Ser. No. 59,755
9 Claims. (Cl. 74—569)

This invention relates to mechanical valve tappets and more particularly to a tappet of the barrel type comprising a hollow cylindrical body closed at one end and open at the other end made of a low carbon steel seamless tubing and having a wear resistant foot or head piece brazed in the open end of the body and provided with means for releasing gas and vapor from the hollow chamber during brazing of the structure and also inhibiting the sucking in of oil during quenching of the structure following heat treat.

It has heretofore been suggested as illustrated for example in the patent to Borton 2,014,612 relating to a cam follower to provide a vent hole in the head piece to prevent the building up of pressure within the bore of the hollow body during a combined carborizing treatment and brazing operation utilizing a preformed ring of brazing material positioned between the head piece and the body member. Moreover, in the patent to Line 2,682,863 relating to a valve tappet wherein the socket member is also brazed to the body member by a ring of brazing material which is melted during the brazing operation, notches are provided on the shoulder face of the socket member to permit the escape of gases and air that are present or generated in the hollow of the body when the assembly is heated to a temperature sufficient to melt the brazing material and allow for its flow between the socket and body elements.

It is found that the provision of vent holes as in Patent 2,014,612 is disadvantageous where the heat treated assembly is subject to quenching in oil for in such operation there is a tendency for the cooling assembly to suck oil into the cavity thereof to replace the gas or air which has been vented during heating. Moreover while the shoulder face notches as in Patent 2,682,863 appear to be reasonably successful where a preformed ring of brazing material is employed, the molten brazing material sometimes seals the assembly before all of the generated gas may escape and this is found to be particularly the case where in place of a ring of brazing material the head piece insert was plated or coated with brazing material and pressed together prior to heating to the brazing temperature. In the latter case it is found that where the coating is of sufficient thickness, in the order of six ten-thousandths of an inch (0.0006″) and more in thickness over a rough cast surface, a substantial seal is effected between the assembled pieces during the pressing operation. When the assembly is subsequently heated to brazing temperature in a furnace there is sufficient gas within the cavity that cannot get by in spite of the notches, to cause the assembly to pop apart. When the coating is relatively thin, under about .0006″ the gas seems to be able to bleed off.

I have discovered that this difficulty may be overcome by providing one or more grooves on the shank portion of the insert the full length thereof or upon the inner surface of the body piece or both that will facilitate the escape of gas from the assembly during the brazing operation yet will seal the head member to the hollow body to prevent the influx of oil during quenching following heat treatment.

A principal object of the invention is therefore that of providing a novel mechanical tappet structure where the insert is brazed to the tappet body by means of a coating of brazing material previously applied to the insert or body or both which is melted upon raising the temperature of the assembly to the fusion point of the brazing material which will permit the escape of gases from the tappet body during brazing and effectively seal the insert in the body to prevent the influx of oil during quenching.

A specific object is to provide a structure as in the preceding object wherein the shank portion of the insert or the internal surface of the tappet body is provided with one or more grooves extending generally longitudinally of these members.

Other objects and advantages of the invention will be apparent from the following description taken in connection with the drawings wherein:

FIGURE 1 shows a fragmentary elevational view in partial section of a hollow tappet body of a mechanical tappet or similar article prior to assembly in the open end thereof of a foot or head piece, the tapered shank of which is prepared with a coating of brazing material and provided with a vent groove;

FIGURE 2 is a sectional elevation of the tappet assembly of the parts of FIGURE 1 showing the manner of employing the same in an engine valve train operation;

FIGURE 3 is a cross sectional view taken at 3—3 of FIGURE 2; and

FIGURE 4 shows a fragmentary sectional view of a modification of the structure in FIGURE 2 showing the vent groove on the body section showing the parts as assembled prior to brazing.

Referring to the drawings, the numeral 10 generally represents a mechanical valve tappet comprising a cylindrical body member 12 and a cylindrical insert or foot member 14. The body 12, as seen, is of hollow construction having a bore or chamber 16 closed at one end 18, the latter being provided with a cavity 20 to receive a push rod 22. The tappet insert or foot piece 14 is comprised of a head portion 24 against which a cam 25 is normally operable and a shank portion 26 which is adapted to be received within the bore 16 of the tappet body.

The body member may be made of a suitable low carbon steel such as an SAE 1020 or SAE 1016 steel and formed from a solid chunk thereof by suitable stamping and forming operations. The insert is preferably made of a hardenable iron and preferably rough cast so as to provide a rough surface aiding in the retention of a brazing coating 27 prior to brazing and to aid the escape of gas during the brazing operation. The shank 26 of the insert member is moreover preferably made with a slight taper to aid assembly of the parts after coating. In the latter connection it will be understood that the upper portion of the shank adjacent the head may be somewhat oversized with respect to the dimension of the bore 16 but the body material is sufficiently ductile to permit expansion thereof when the insert is pressed in position, it being merely necessary that the outer end of the shank 26 with its coating be of small enough dimension to facilitate the assembly.

As previously stated, the present invention is concerned with a mechanical tappet structure wherein the insert is brazed to the body by a coating of brazing material previously applied to one or both parts thereof. It is found to be sufficient and it is preferred to apply the coating of brazing material to the insert 14 only and this may be carried out by dipping the member 14 in a hot molten brazing composition, by dipping in a bath of powdered brazing material in a liquid carrier or by spraying this member with either of such compositions. Moreover, the member may be coated by electroplating or electroless plating depending upon the character of the brazing composition. Use of a brazing composition low enough in melting point such that the character of the metal of the tappet will not be affected in brazing is desirable. A copper-tin alloy brazing composition or a mixture of copper and tin to provide such an alloy in the brazing operation meet this requirement and permit temperatures to be employed during brazing which do not have an adverse effect upon the composition of the tappet structure from the standpoint of subsequent carbo-nitriding treatment.

Following coating of the insert, this part is pressed into the bore of the tappet body. The coating, which will preferably have a thickness in excess of .0006" and preferably .001" or greater will be sufficient to seal the inner chamber so that even though the shank 26 of the insert has a rough cast surface, the seal is sufficient to inhibit the release of trapped air or gas on heating the assembly to a brazing temperature of 1680° F. to 1700° F. Popping of the inserts when so heated could result.

As previously described, it has been found that when bonding the tappet components in the manner described by a precoating of brazing material, popping of the insert by gas or vapor pressure can only be properly controlled by a groove 30 such as shown in FIGURE 1 extending between the internal cavity and the head of the insert. It is preferred that when the brazing coating is only on the insert that the venting groove be on the shank thereof since the surface of the groove will also be then coated and assure subsequent sealing of the structure after the gas or vapor is vented. It will be understood that with proper conditions, the groove can be on the body member as seen in the modification in FIGURE 4 where it is designated by the numeral 32. In either case a recess or groove of about 1/16" in width and 1/32" in depth is found sufficient. When the assembled parts are heated in a controlled atmosphere to the fusion point of the brazing material, this recess or recesses will provide a sufficient opening to permit the blowby of sufficient air and gas before the joint between the body member and insert is completely sealed by brazing material.

Use of the recesses does not leave an opening in the joint between the body and insert upon cooling of the brazed structure. It has been found that the alloy apparently balls up at the shoulder end of the recess and when the brazed assembly is air-cooled, forms a tight seal between the insert and the tappet body. Moreover, this seal remains effective when the assembly is subsequently subjected to a carbo-nitriding treatment at a temperature of about 1575° F. and no oil gets into the cavity of the tappet body when the assembly is quenched in oil during this treatment.

Although I have described my invention in connection with the use of copper-tin alloy brazing coatings, for which compositions containing between 20% to 60% tin by weight and 40% to 80% copper by weight are best, it will be understood that other alloy compositions may be employed in a similar way and that where lower brazing temperatures are desired to be used or a less expensive alloy such as tin-lead is deemed essential or desirable the individual parts may be subjected to the necessary heat treatment prior to coating with the lead-tin brazing alloy, then coated therewith, pressed together, and heated to the necessary brazing temperature, that for tin-lead alloys being in the neighborhood of 500° to 600° F. The grooves I have provided in the insert or body will function in a similar manner in such a procedure to permit the release of entrapped air and gas during brazing or soldering and preventing the popping of the inserts from the assembly.

From the above description of my invention, it will be apparent that I have provided a novel construction enabling the brazing of the parts of mechanical tappets utilizing coatings of brazing material and which may be effectively brazed to form a sealed assembly without causing popping of the insert from the tappet body during brazing and subsequent heating operations. It will be understood that various modifications may suggest themselves to those skilled in the art without departing from the spirit and scope of my invention and all such modifications as may come within the scope of the appended claims are contemplated.

I claim:

1. A mechanical tappet comprising a cylindrical body member having a central bore closed at one end to define an internal cavity, an insert member having a head portion and a shank portion, the latter extending into and tightly fitting said bore of said body member with its head portion substantially abutting said body member, the circumferential interface between said body member and said shank of said insert member being interrupted by a longitudinal recess connecting said cavity with said abutment to provide an escape passage for gas or vapor from said cavity and brazing material bonding the shank of said insert member to said body member and closing said recesss whereby to provide a closed cavity.

2. A mechanical tappet comprising a cylindrical body member of low carbon steel having a central bore closed at one end to define an internal cavity, an insert member of a hardenable cast iron having a head portion and a shank portion the latter extending into and tightly fitting said bore of said body member with its head portion substantially abutting said body member, the circumferential interface between said body member and said shank of said insert member being interrupted by a longitudinal recess connecting said cavity with said abutment to provide an escape passage for gas or vapor from said cavity and brazing material bonding the shank of said insert member to said body member and closing said recess whereby to provide a closed cavity.

3. A mechanical tappet as claimed in claim 1 wherein said recess is on one of said body member and said insert member shank.

4. A mechanical tappet as claimed in claim 1 wherein said brazing material comprises an alloy of tin.

5. A mechanical tappet as claimed in claim 1 wherein said brazing material comprises copper-tin.

6. A mechanical tappet as claimed in claim 1 wherein the shank of said insert member has a rough cast surface.

7. A mechanical tappet comprising a cylindrical body member of low carbon steel having a central bore closed at one end to define an internal cavity, an insert member of a hardenable cast iron having a head portion and a shank portion the latter extending into and tightly fitting said bore of said body member with its head portion substantially abutting said body member, the circumferential interface between said body member and said shank of said insert member being interrupted by a longitudinal recess connecting said cavity with said abutment to provide an escape passage for gas or vapor from said cavity and a coating of brazing material substantially covering at least the entire circumferential portion of said shank portion and bonded thereto.

8. A mechanical tappet as claimed in claim 7 wherein said shank portion has a rough cast surface to which said coating is bonded and said coating has a thickness of at least 0.0006" and substantially no greater than .0005".

9. A method of making a mechanical tappet comprising forming a cylindrical mild steel body member having a central bore closed at one end to define an internal cavity of predetermined depth to receive a close fitting end cap, casting an end cap of a hardenable iron, said end cap having a head portion and having a shank portion of a length of less depth than said cavity, said shank portion being tapered and of such dimension as to facilitate entry of the tip of said shank portion into said bore and produce a tight fit with said body member when said shank portion is pressed into said bore with the head portion of said insert in substantial abutment with said body member, forming a narrow longitudinally extending relatively shallow recess on a surface portion of one of said shank portion and bore, said recess being of a length connecting said cavity with said abutment when said parts are pressed together as aforesaid whereby to provide an escape passage for gas or vapor from said cavity, coating at least the shank portion of said insert over its cast surface with a layer of metal alloy brazing material of at least .0006″ thickness, pressing the shank portion of said coated insert into said bore with its head portion in substantial abutment with said body member, heating said assembly to a temperature sufficient to cause fusion of said brazing material and for a sufficient time to bond said insert to said body member by means of said alloy brazing material, said alloy brazing material when hardened sealing off said cavity and said escape passage.

References Cited in the file of this patent
UNITED STATES PATENTS

| | | |
|---|---|---|
| 2,014,612 | Borton | Sept. 17, 1935 |
| 2,055,342 | Schneider | Sept. 22, 1936 |
| 2,081,390 | Trapp | May 25, 1937 |
| 2,265,561 | Hoern | Dec. 9, 1941 |
| 2,682,863 | Line | July 6, 1954 |
| 2,832,570 | Schoessow | Apr. 29, 1958 |
| 2,933,949 | Bouwkamp | Apr. 26, 1960 |
| 2,939,442 | Dornbos et al. | June 7, 1960 |
| 2,963,011 | Davis et al. | Dec. 6, 1960 |